(12) United States Patent
Matsuki et al.

(10) Patent No.: US 9,358,951 B2
(45) Date of Patent: Jun. 7, 2016

(54) SEATBELT RETRACTOR

(71) Applicant: Autoliv Development AB, Vårgårda (SE)

(72) Inventors: Masuo Matsuki, Yokohama (JP); Katsuhiro Ito, Yokohama (JP); Takashi Kageyama, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 116 days.

(21) Appl. No.: 14/372,075

(22) PCT Filed: Jan. 9, 2013

(86) PCT No.: PCT/JP2013/050227
§ 371 (c)(1),
(2) Date: Jul. 14, 2014

(87) PCT Pub. No.: WO2013/105580
PCT Pub. Date: Jul. 18, 2013

(65) Prior Publication Data
US 2015/0001329 A1   Jan. 1, 2015

(30) Foreign Application Priority Data

Jan. 13, 2012 (JP) ................................ 2012-005403

(51) Int. Cl.
*B60R 22/40* (2006.01)
*B60R 22/36* (2006.01)
*B60R 22/26* (2006.01)

(52) U.S. Cl.
CPC ................. *B60R 22/36* (2013.01); *B60R 22/26* (2013.01); *B60R 22/40* (2013.01); *B60R 2022/403* (2013.01)

(58) Field of Classification Search
CPC ........ B60R 22/36; B60R 22/40; B60R 22/405
USPC .......................... 242/384, 384.2, 384.4, 384.6
See application file for complete search history.

(56) References Cited

U.S. PATENT DOCUMENTS 4,522,350 A * 6/1985 Ernst .................... B60R 22/405
                                                                242/376.1
5,716,102 A * 2/1998 Ray ........................ B60R 22/26
                                                                242/384.4

(Continued)

FOREIGN PATENT DOCUMENTS

JP    2000-052921 A    2/2000
JP    2000-079867 A    3/2000

(Continued)

OTHER PUBLICATIONS

Japanese Patent Office, International Search Report of International Application No. PCT/JP2013/050227, Mailed on Mar. 5, 2013 (2 pages).

*Primary Examiner* — Sang Kim
(74) *Attorney, Agent, or Firm* — Brinks Gilson & Lione

(57) ABSTRACT

A counterweight that biases a ratchet lever toward an unlocking side, in addition to a self weight of the ratchet lever, is provided in a mechanism that locks pull-out operation of a seatbelt according to operation of an acceleration sensor. The counterweight is provided with a moment transmission projection that allows the ratchet lever to turn freely as a result of non-engagement between the counterweight and the ratchet lever when a tilt angle of a seat back is less than 60°, and that transmits rotational moment by a self weight of the counterweight (rotational moment in the direction of an arrow R3) to the ratchet lever as a rotary bias force toward the unlocking side as a result of engagement between the counterweight and an engagement wall of the ratchet lever when the tilt angle of the seat back is 60° or more.

4 Claims, 9 Drawing Sheets

(56) References Cited

U.S. PATENT DOCUMENTS

| | | | |
|---|---|---|---|
| 6,015,164 A * | 1/2000 | Yano | B60R 22/26 242/384.4 |
| 6,068,340 A | 5/2000 | Yano et al. | |
| 9,079,563 B2 * | 7/2015 | Ito | B60R 22/40 |
| 9,090,228 B2 * | 7/2015 | Ono | B60R 22/40 |

FOREIGN PATENT DOCUMENTS

| | | |
|---|---|---|
| JP | 2009-274613 A | 11/2009 |
| JP | 2010-149585 A | 7/2010 |

* cited by examiner

For right seat (R)

For left seat (L)

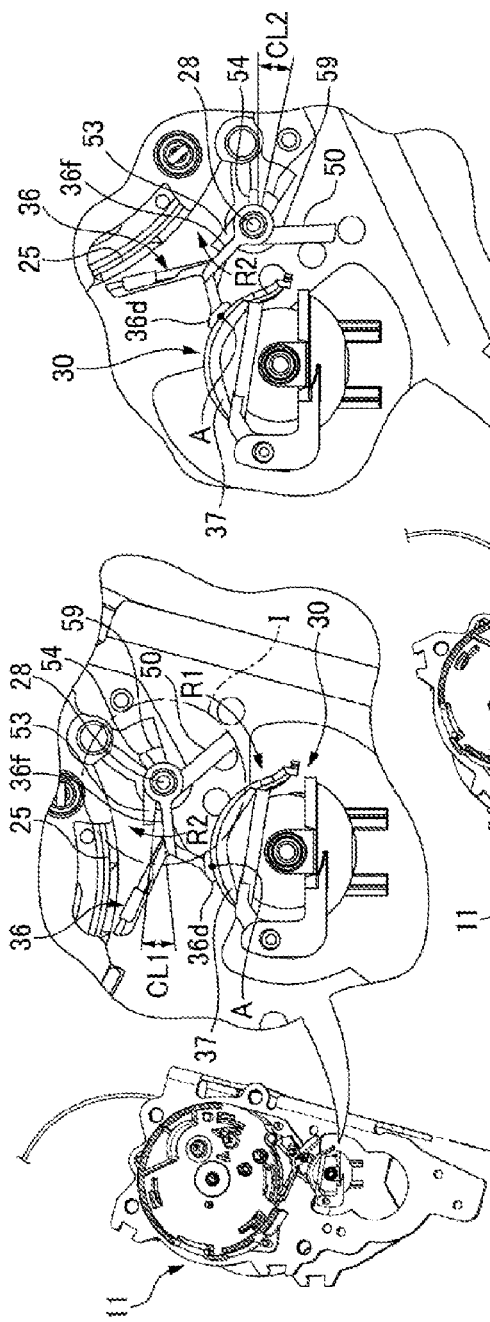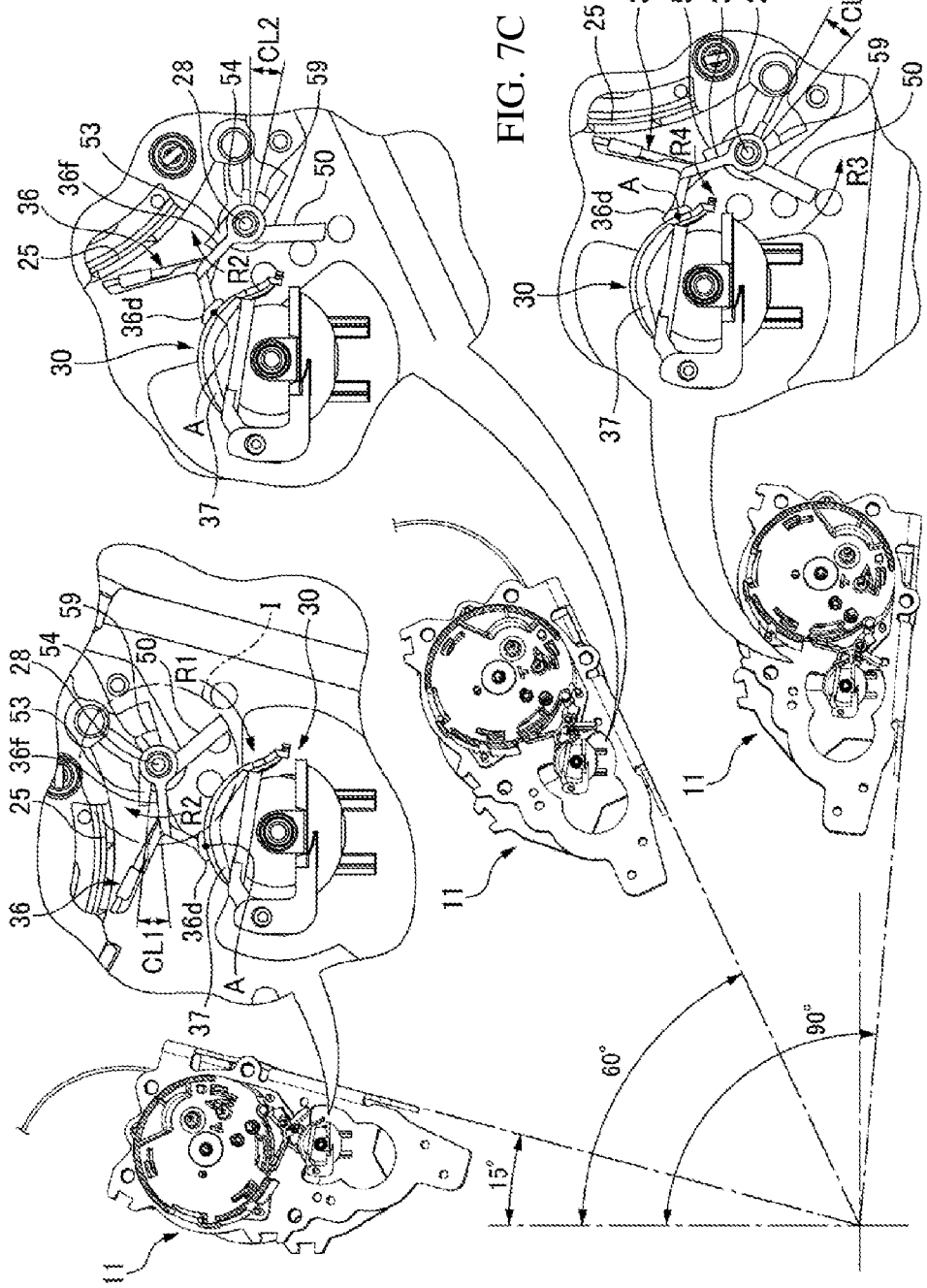

SEATBELT RETRACTOR

BACKGROUND OF THE INVENTION

1. Field of the Invention

The present invention relates to seatbelt retractors included in seatbelt devices for protecting occupants inside vehicles and, more particularly, to a seatbelt retractor that is attached to a seat back of a reclining seat.

2. Description of the Related Technology

A seatbelt device mounted on a vehicle is to protect an occupant at the time of a vehicle collision and the like by restraining the occupant in a seat by a seatbelt pulled out from a seatbelt retractor. When acceleration higher than a predetermined value is applied in the horizontal direction at the time of the vehicle collision and the like, the seatbelt retractor detects the acceleration by an acceleration sensor, allows a lock mechanism of the seatbelt to operate, and thus makes it impossible to pull out the seatbelt. An inertial body using a ball or an independent inertial body is known as the inertial body used in the acceleration sensor.

Incidentally, when the seatbelt retractor that is provided with this kind of acceleration sensor is installed in a seat back of a reclining seat, a posture of the seatbelt retractor changes according to a reclining angle of the seat back, and the acceleration cannot be detected properly under this state. In response to this, the seatbelt device that is provided with the acceleration sensor capable of detecting the acceleration properly irrespective of the reclining angle of the seat back is known (refer to, for example, Japanese Patent Application Publication No. 2000-79867 and Japanese Patent Application Publication No. 2000-52921).

According to the seatbelt device described in Japanese Patent Application Publication No. 2000-79867 and Japanese Patent Application Publication No. 2000-52921, a cable advance/retreat device that allows a cable to advance/retreat by a length corresponding to a tilt angle of the seat back is arranged at a connection part between a seat back support arm that is provided projectingly from a seat cushion and a reclining rotary shaft, and, when the seat back tilts in the longitudinal direction, a sensor reference line of the acceleration sensor is controlled to face the vertical direction at all times by a cable hung between the cable advance/retreat device and a seatbelt retractor, so as to detect the acceleration properly.

Further, with the seatbelt retractor that is used in the seatbelt device described in Japanese Patent Application Publication No. 2000-79867 and Japanese Patent Application Publication No. 2000-52921, movement of an inertial body (sensor weight) of the acceleration sensor allows a ratchet lever (second lever) of the lock mechanism to turn upwardly, and allows a claw at the tip end of the ratchet lever to engage with teeth of a steering wheel (ratchet wheel) rotating with a spindle, so as to lock the steering wheel, and thus to prevent pull-out operation of the seatbelt.

SUMMARY OF THE INVENTION

Incidentally, when the seat back is reclined, the relationship of a gravity center position of the ratchet lever of the lock mechanism with respect to a turning center of the ratchet lever changes. Specifically, when the tip end part of the ratchet lever that is supported on a retractor frame side is placed on a sensor lever of the acceleration sensor by its self weight, longer horizontal distance between the rotation center of the ratchet lever and the gravity center position of the ratchet lever is secured, and the rotational moment that is required for the ratchet lever to rotate to a locking side increases, when the reclining angle of the seat back is small. Namely, accidental turning of the ratchet lever to the locking side due to small shocks (slight vibration of the vehicle and deceleration in braking) and the like are not caused. When the reclining angle of the seat back increases, however, the horizontal distance between the rotation center of the ratchet lever and the gravity center position of the ratchet lever is reduced, and the ratchet lever is easily rotated to the locking side by the small rotational moment. Namely, such malfunctions may be caused that the ratchet lever is rotated to the locking side due to the small shocks, the claw at the tip end of the ratchet lever is engaged with the teeth of the steering wheel, and the pull-out operation of the seatbelt is locked unintentionally.

The present invention is made in view of the above-described problems, and an object of the present invention is to provide a seatbelt retractor capable of preventing accidental locking of pull-out operation of a seatbelt due to small shocks and the like, and of securing stable operation of a lock mechanism, irrespective of a tilt angle of a seat back.

The above-described object of the present invention is achieved by the following configuration.

(1) A seatbelt retractor including: a retractor frame that is attached to a seat back of a reclining seat and that tilts with the seat back when adjusting a reclining angle; a spindle that is rotatably supported by the retractor frame and that winds a seatbelt; an acceleration sensor that is attached to the retractor frame and that detects acceleration in a longitudinal direction of a vehicle; a lock mechanism that locks pull-out operation of the seatbelt according to the acceleration in the longitudinal direction of the vehicle detected by the acceleration sensor; and a posture control mechanism that keeps a sensor reference surface of the acceleration sensor horizontally, in which the acceleration sensor includes a sensor cover that is fixed to the retractor frame, an inertial body that moves in the longitudinal direction of the vehicle when acceleration of a predetermined value or more is applied in the longitudinal direction of the vehicle, a sensor housing that includes a swing shaft along a right/left direction of the vehicle, that is supported by the sensor cover, that has an inertial body support surface, on which the inertial body is placed, as the sensor reference surface, and that is allowed to swing, by the posture control mechanism, according to a tilt angle of the seat back, so as to keep the inertial body support surface horizontally, and a first lever that is arranged on an upper side of the inertial body, that is displaced together with movement of the inertial body in the longitudinal direction of the vehicle, and that operates the lock mechanism toward a locking side, and the lock mechanism includes a steering wheel that rotates integrally with the spindle, and that includes a plurality of locking teeth on its outer peripheral surface, a second lever that includes a claw part capable of engaging with the locking teeth of the steering wheel, that is turnably supported by a support shaft provided on the retractor frame or a member that tilts integrally with the retractor frame, that is placed on an upper surface of the first lever by its self weight, and that allows the claw part to engage with the locking teeth so as to lock the steering wheel, and a counterweight that is provided separately from the second lever and that biases the second lever toward an unlocking side.

(2) The seatbelt retractor according to (1), in which the counterweight is provided to be able to apply a rotary bias force toward the unlocking side to the second lever, when the tilt angle of the seat back is a predetermined angle or more.

(3) The seatbelt retractor according to (2), in which counterweight is provided to be able to turn coaxially with the support shaft of the second lever, and either one of the counterweight and the second lever is provided with a moment transmission part that allows the second lever to turn freely as a result of non-engagement between the counterweight and the second lever when the tilt angle of the seat back is less than the predetermined angle, and that transmits rotational moment by a self weight of the counterweight to the second lever as the rotary bias force toward the unlocking side as a result of engagement between the counterweight and the second lever when the tilt angle of the seat back is the predetermined angle or more.

(4) The seatbelt retractor according to (3), in which the lock mechanism and the acceleration sensor are arranged in such a manner that a virtual circle, drawn by a tip end of the counterweight, crosses the sensor lever when the counterweight is rotated about the support shaft of the second lever, and a rotation stopper, which limits turning of the counterweight relative to the retractor frame when the tilt angle of the seat back is less than the predetermined angle, is provided.

Incidentally, "vertical" or "vertical direction" according to the present invention means the direction of the floor and the ceiling viewed from the center of the vehicle, and "right/left or right/left direction" means the direction of the width of the vehicle.

Further, "horizontal" or "horizontal direction" includes horizontality (horizontal direction) and a range that is slightly deviated from the horizontality, such as an error caused during manufacturing, as long as the effect of the present invention can be produced in designing a product.

With the seatbelt retractor according to the present invention, the second lever is rotatably biased to the unlocking side by the counterweight, in addition to the rotational moment caused by the self weight of the second lever itself. This makes it possible to increase the rotational moment that is necessary to cause the second lever to turn to the locking side, to prevent accidental locking of the pull-out operation of the seatbelt due to the small shocks and the like, and to secure stable operation of the lock mechanism.

Further, when the reclining angle becomes the predetermined angle or more, the counterweight is made to apply the rotary bias force toward the unlocking side to the second lever. This makes it possible to prevent accidental movement of the second lever to the locking side, when the reclining angle is large, and to allow the the second lever to operate smoothly, according to the operation of the acceleration sensor, without being affected by the counterweight, when the reclining angle is less than the predetermined angle.

Furthermore, when the reclining angle is less than the predetermined angle, the second lever is able to turn freely irrespective of the counterweight. Therefore, the second lever can be operated smoothly according to the operation of the acceleration sensor. Moreover, when the reclining angle is the predetermined angle or more, the rotational moment by the self weight of the counterweight is transmitted to the second lever as the rotary bias force to the locking side, and therefore, the accidental movement of the second lever to the locking side can be prevented. Further, when the reclining angle is the predetermined angle or more, the position of the counterweight changes and the rotational moment of the counterweight increases, by following the posture change of the second lever, as the reclining angle increases. Therefore, the reduction in the rotational moment by the self weight of the second lever can be compensated by the increase in the rotational moment due to the self weight of the counterweight.

Further, when the reclining angle is less than the predetermined angle, a rotation stopper limits the turning of the counterweight. Thus, the interference between the counterweight and the acceleration sensor can be avoided, and the counterweight can be disposed in a compact manner.

BRIEF DESCRIPTION OF THE DRAWINGS

FIGS. 5A and 5B are illustrations of a ratchet lever and a counterweight, used in a lock mechanism of the seatbelt retractor, in which FIG. 5A is a perspective view illustrating the state where the ratchet lever and the counterweight are assembled, and FIG. 5B is a perspective view illustrating the state before assembling the ratchet lever and the counterweight;

FIGS. 7A-7C are a set of side views illustrating the state of the ratchet lever and the counterweight according to respective tilt angles, when the seatbelt retractor tilts with the seat back, in which FIG. 7A illustrates the state where the tilt angle is 15°, FIG. 7B illustrates the state where the the tilt angle is 60°, and FIG. 7C illustrates the state where the the tilt angle is 95°;

FIGS. 8A-8C are a set of graphs illustrating changes in the rotational moment according to the tilt angle (reclining angle) of the seat back by comparing between the case where a counterweight is present and the case where a counterweight is not present, in the seatbelt retractor according to the embodiment, in which FIG. 8A is a graph illustrating the change in the rotational moment of the ratchet lever, FIG. 8B is a graph illustrating the change in the rotational moment by a load in the normal direction at a point A as a point of contact of the ratchet lever and the sensor lever, and FIG. 8C is a graph illustrating the change in the rotational moment affecting the sensor lever, respectively.

DESCRIPTION OF THE PREFERRED EMBODIMENTS

Hereinafter, an embodiment of a seatbelt retractor according to the present invention will be explained in detail with reference to the drawings.

Figure 1A:
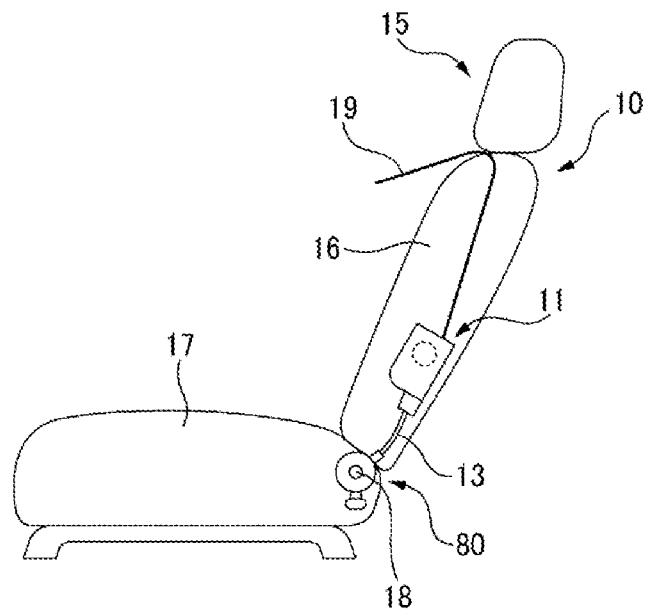
FIG. 1A is a side view of a reclining seat that is provided with a seatbelt device including a seatbelt retractor according to an embodiment of the present invention.
Figure 1B:
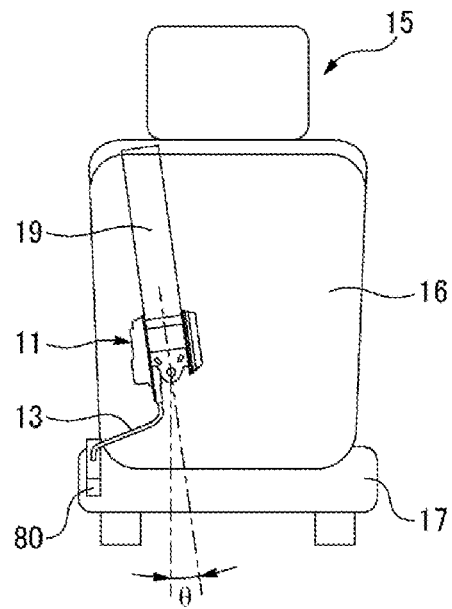
FIG. 1B is a rear view of the left reclining seat.
Figure 1C:
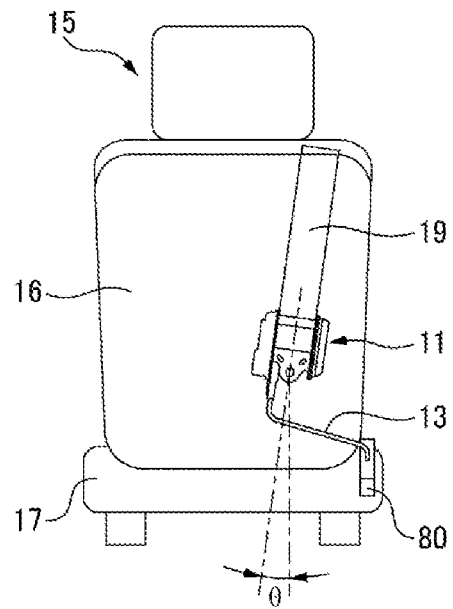
FIG. 1C is a rear view of the right reclining seat.

FIGS. 1A to 1C illustrate a reclining seat that is provided with a seatbelt device 10 including a seatbelt retractor 11 according to this embodiment. This seatbelt device 10 is provided with a seatbelt retractor 11 that is attached to a seat back 16 of a reclining seat 15 and that winds a seatbelt 19 when necessary, and a cable advance/retreat device 80 that is arranged at a connection part 18 of the seat back 16 and a seat cushion 17 of the reclining seat 15 and that transmits tilt operation of the seat back 16 to the seatbelt retractor 11 via a cable 13 by advancing/retreating the cable 13 by distance corresponding to a tilt angle of the seat back 16. The seatbelt device 10 restrains an occupant inside a vehicle in the reclining seat 15.

A later-described covering tube, both ends of which are fixed to the seatbelt retractor 11 and a casing or the like of the cable advance/retreat device 80, usually covers the cable 13, and is configured to allow the cable 13 that is housed therein to slide smoothly relative to the covering tube.

According to a reclining angle of the seat back 16 (a tilt angle in the longitudinal direction of the vehicle), the seatbelt retractor 11 tilts at an arbitrary angle in the longitudinal direction of the vehicle. In the width direction of the vehicle (the right/left direction of the vehicle), the seatbelt retractor 11 is attached to have an attachment angle θ that varies according to car models, seat specifications and the like, so that the seatbelt 19 can be smoothly fed from the seatbelt retractor 11. Here, the seatbelt retractor 11 is attached to the seat back 16 by tilting by about 15° toward the rear side of the vehicle (backward reclining) 15° and by tilting by the attachment angle θ (=15°) in the width direction (right/left direction) of the vehicle, as a reference attachment posture. Namely, as illustrated in FIG. 1B, the seatbelt retractor 11 is attached in the left seat by tilting by the attachment angle θ (=15°) toward the left side when viewed from the rear side and, as illustrated in FIG. 1C, the seatbelt retractor 11 is attached in the right seat by tilting by the attachment angle θ (=15°) toward the right side when viewed from the rear side.

Figure 2A:
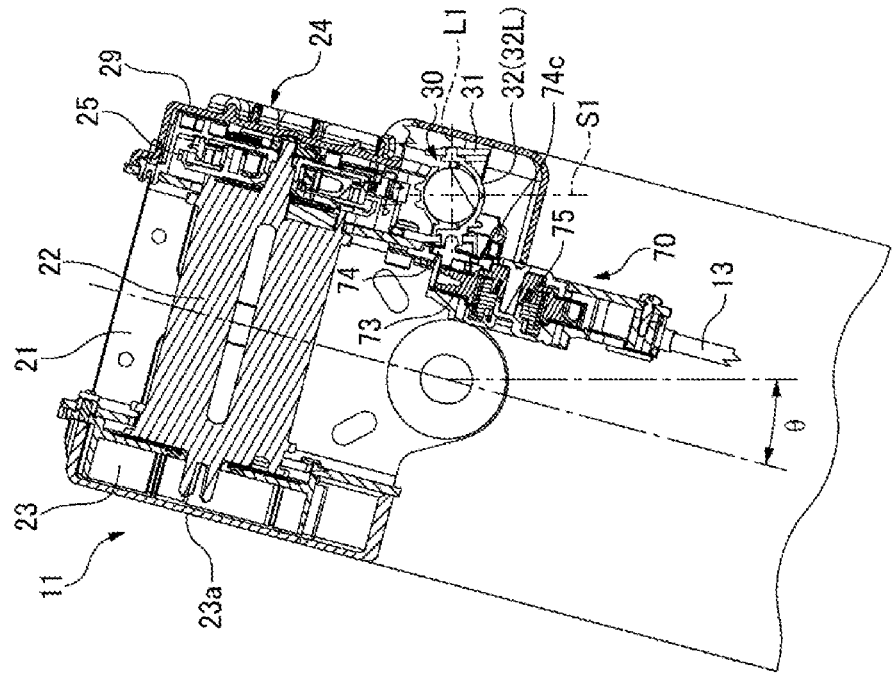
FIG. 2A is a cross-sectional view of the seatbelt retractor for the right seat viewed from the front side of the vehicle, the seatbelt retractor being attached by tilting toward the left side by a predetermined angle θ.
Figure 2B:
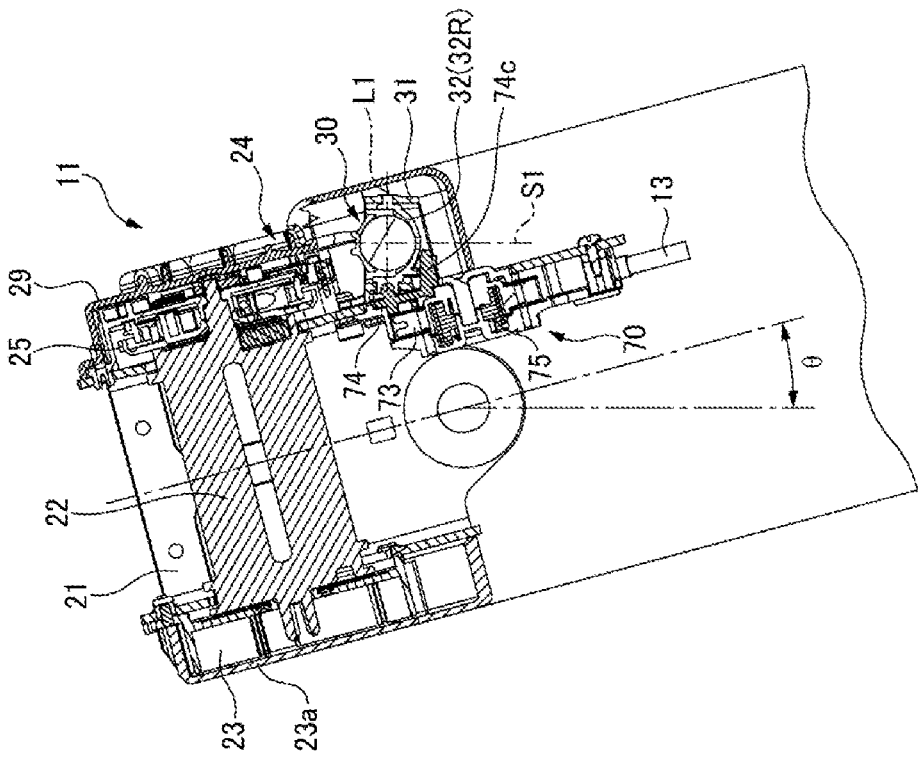
FIG. 2B is a cross-sectional view of the seatbelt retractor for the left seat viewed from the front side of the vehicle, the seatbelt retractor being attached by tilting toward the right side by the predetermined angle θ.
Figure 3:
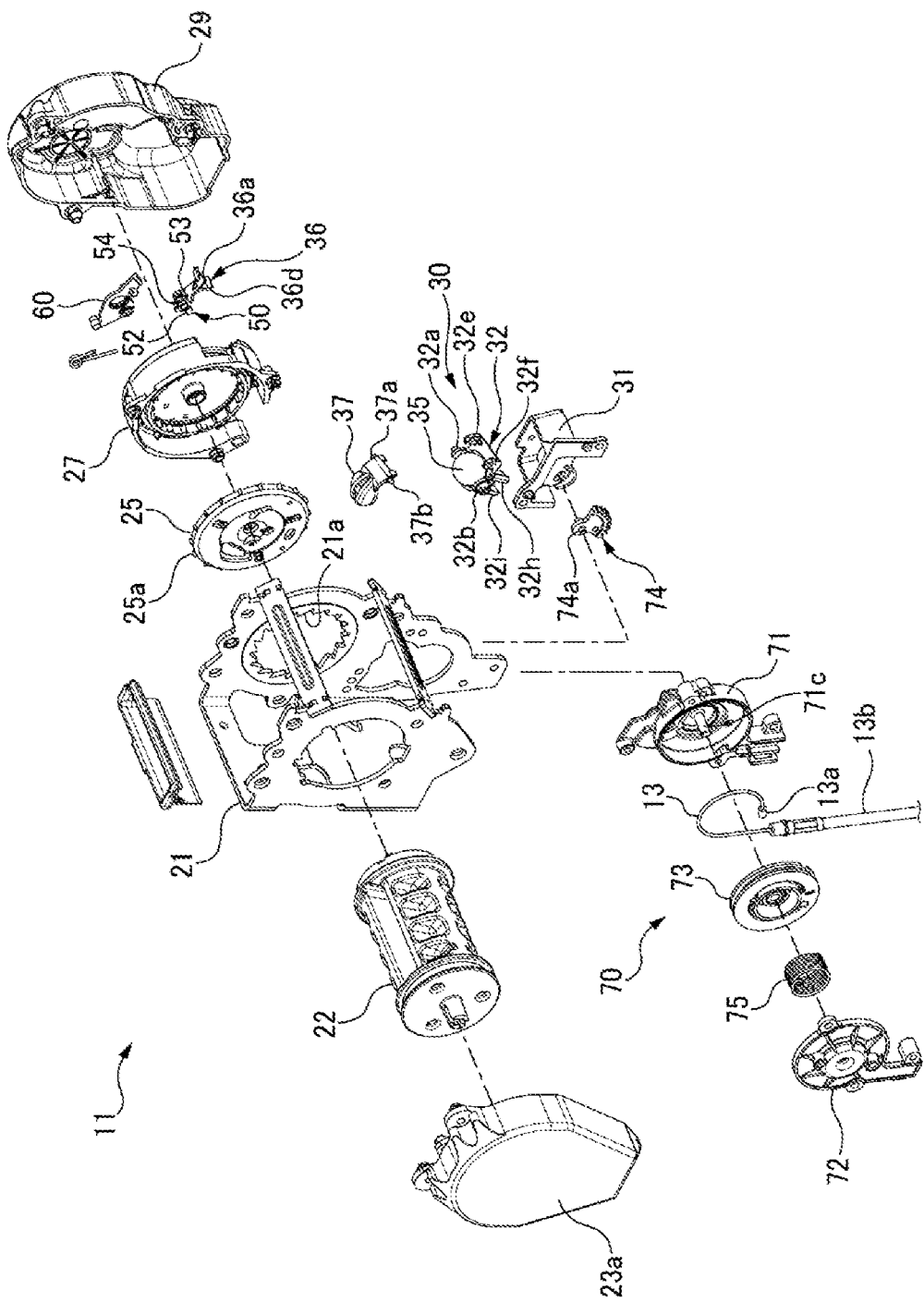
FIG. 3 is an exploded perspective view of the seatbelt retractor.

As illustrated in FIGS. 2A and 2B and FIG. 3, the seatbelt retractor 11 is provided with a retractor frame 21 that is attached to the seat back 16 by tilting in the right/left direction of the vehicle relative to a straight line extending in the vertical direction at the center of the right/left direction of the seat back 16, and a spindle 22 for winding the seatbelt 19 is rotatably supported by the retractor frame 21.

On one end side in the axial direction of the spindle 22, a retractor spring 23 that rotatably biases the spindle 22 in the winding direction of the seatbelt 19 is connected, and the retractor spring 23 is housed in a cover 23a.

On the other end side in the axial direction of the spindle 22, a steering wheel 25 as a component of a lock mechanism 24 that locks pull-out operation of the seatbelt 19, an acceleration sensor 30 that is attached to the retractor frame 21, that detects acceleration in the longitudinal direction applied to the vehicle, and that operates the lock mechanism 24 according to the detected acceleration, and a posture control mechanism 70 that keeps a sensor reference surface of the acceleration sensor 30 (an inertial body support surface 33 that will be described later) horizontally, irrespective of the tilt angle of the seat back 16 are provided.

The steering wheel 25, coupled to the spindle 22 so as to rotate integrally with the spindle 22, is provided with a plurality of locking teeth 25a that are arranged on its outer peripheral surface with predetermined intervals therebetween in the circumferential direction and that engage with an upper claw part 36a of a later-described ratchet lever (second lever) 36, and is housed inside a steering wheel cover 27 that is fixed to the retractor frame 21. Further, the entire side surface on the other end side of the seatbelt retractor 11, including the acceleration sensor 30, is covered by a retractor cover 29.

The acceleration sensor 30 includes a sensor cover 31 that is fixed to the outer side surface of the retractor frame 21 so as to tilts integrally with the seat back 16 in the longitudinal direction of the vehicle, a sensor housing 32 that is supported to be able to swing in the longitudinal direction of the vehicle relative to the sensor cover 31, about a swing shaft L1 along the right/left direction of the vehicle, and that keeps the inertial body support surface 33, as the sensor reference surface, horizontally in the longitudinal direction of the vehicle, irrespective of the tilt angle of the seat back 16, by being turned in the longitudinal direction of the vehicle relative to the sensor cover 31 by the posture control mechanism 70, when the seat back 16 tilts, an iron ball 35 as an inertial body that is supported on the inertial body support surface 33 of the sensor housing 32 and that is displaced from a neutral position when the acceleration in the longitudinal direction of the vehicle of a predetermined value or more is applied thereto, and a sensor lever (first lever) 37 that is arranged to cover the upper side of the ball 35 and that is turned upward together with the displacement of the ball 35 in the longitudinal direction of the vehicle so as to operate the ratchet lever 36 to the locking side (upper side).

Specifically, a pair of boss parts 32a and 32b, provided projectingly on the outer side surface of the sensor housing 32, is fitted into a pair of support holes of the sensor cover 31, so as to form the swing shaft L1. The sensor housing 32 is supported to be able to swing in the longitudinal direction of the vehicle, about the swing shaft L1. Further, a pair of turning projections 37a and 37b of the sensor lever 37 is fitted into lever support holes 32e and 32f that are formed in a pair of brackets of the sensor housing 32, and the sensor lever 37 is supported turnably in the longitudinal direction of the vehicle relative to the sensor housing 32, about the turning projections 37a and 37b.

The inertial body support surface 33 as a cone-shaped recessed surface that is recessed downwardly is provided at the upper inner bottom surface of the sensor housing 32, and the ball 35 is placed on the inertial body support surface 33. When the acceleration in the longitudinal direction of the vehicle of the predetermined value or more is applied, the ball 35 as the inertial body is displaced from the neutral position and detects the acceleration applied to the vehicle (that is, the seatbelt retractor 11). It should be noted that the aforesaid state where the inertial body support surface 33 is horizontal means that the reference surface of the inertial body support surface 33 (the lowest surface of the inertial body support surface 33, or a tangent at the lowest point, for example) is horizontal.

Figure 4:
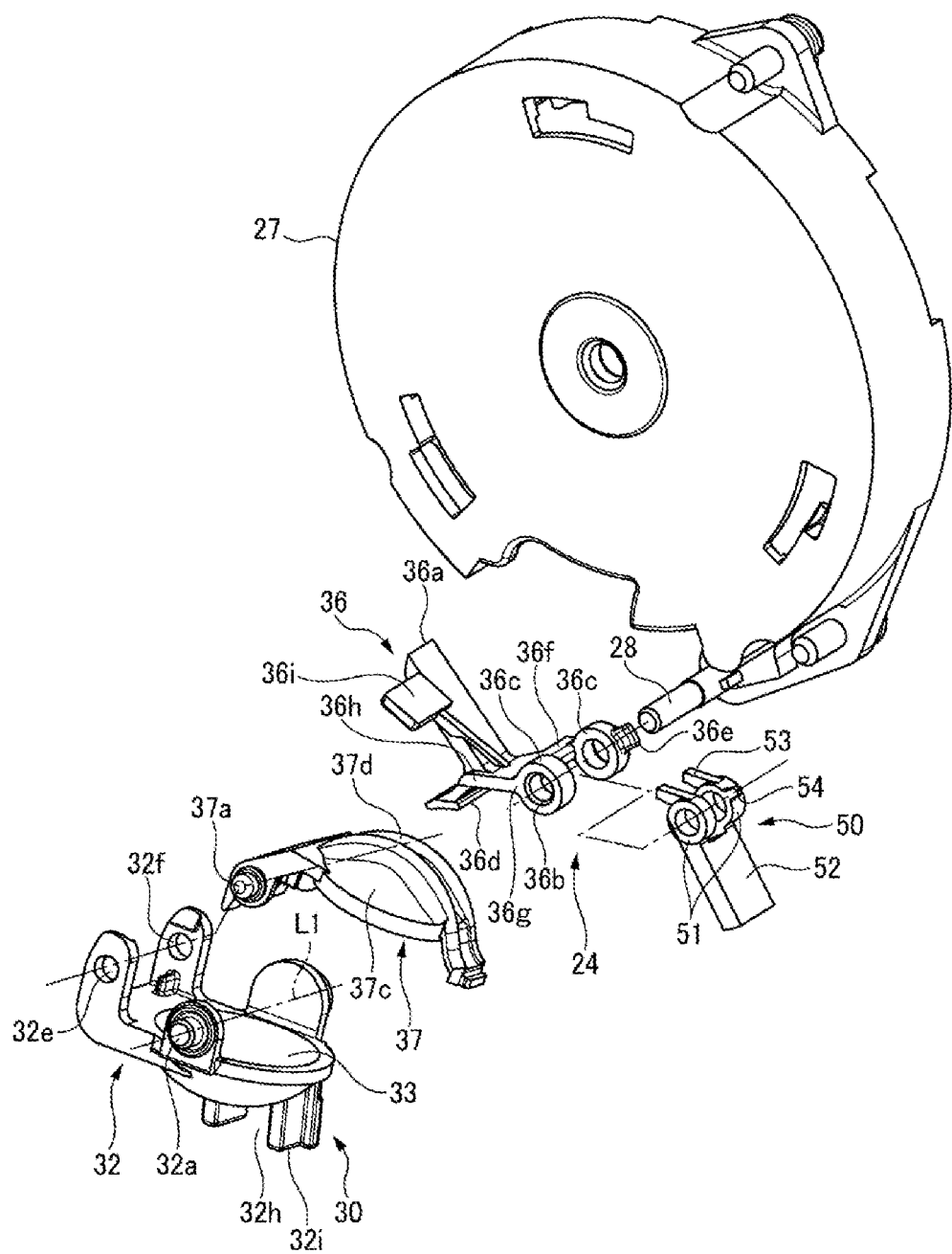
FIG. 4 is an exploded perspective view illustrating a part taken out from the seatbelt retractor, viewed from the direction opposite to that of FIG. 3.

As illustrated in FIG. 3 and FIG. 4, the sensor lever 37 is provided with the turning projections 37a and 37b that are formed at its base end part, a bowl part 37c that is formed at its tip end side to cover the upper surface of the ball 35, and a rib 37d that is formed on the upper surface of the bowl part 37c. The turning projections 37a and 37b are turnably fitted into the lever support holes 32e and 32f of the sensor housing 32. As to the sensor lever 37, the lower surface of the bowl part 37c is in contact with the upper side of the ball 35, and a tip end part 36h of the ratchet lever 36 is placed on the upper surface of the rib 37d by its self weight. When the ball 35 is displaced from the neutral position according to the acceleration, the sensor lever 37 is turned upwardly, the ratchet lever 36 is then pressed upwardly, the upper claw part 36a of the ratchet lever 36 is engaged with the teeth 25a of the steering wheel 25, the steering wheel 25 is locked, and the rotation of the spindle 22 is limited.

The lock mechanism 24 is to lock the pull-out operation of the seatbelt 19 when the acceleration sensor 30 detects high acceleration due to a vehicle collision, and is formed by the aforementioned steering wheel 25, the ratchet lever 36 and a counterweight 50 that will be described later.

Figure 5A:
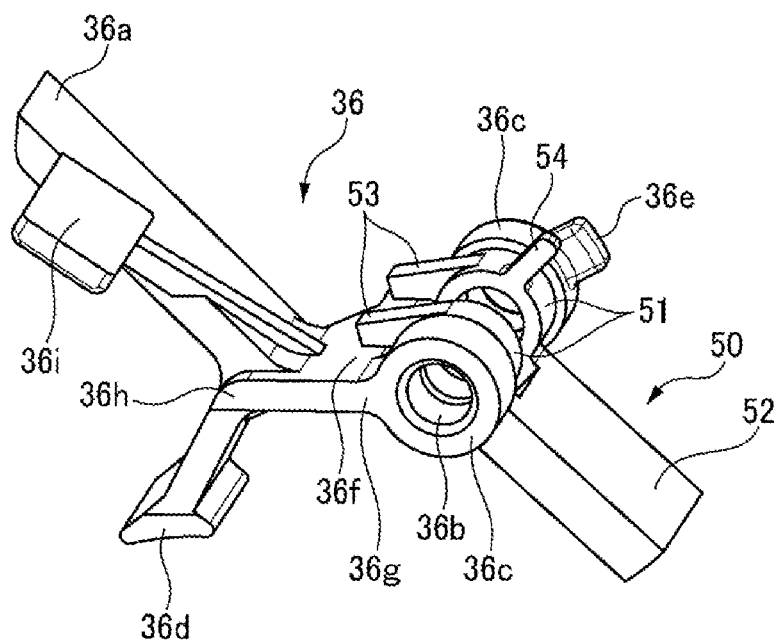
Figure 5B:
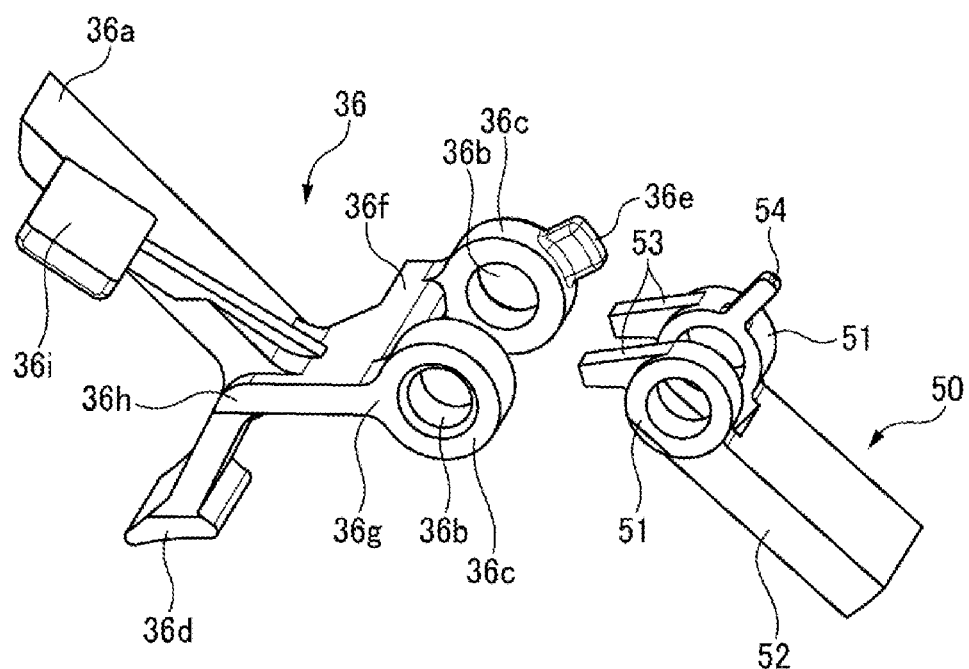
Figure 6:
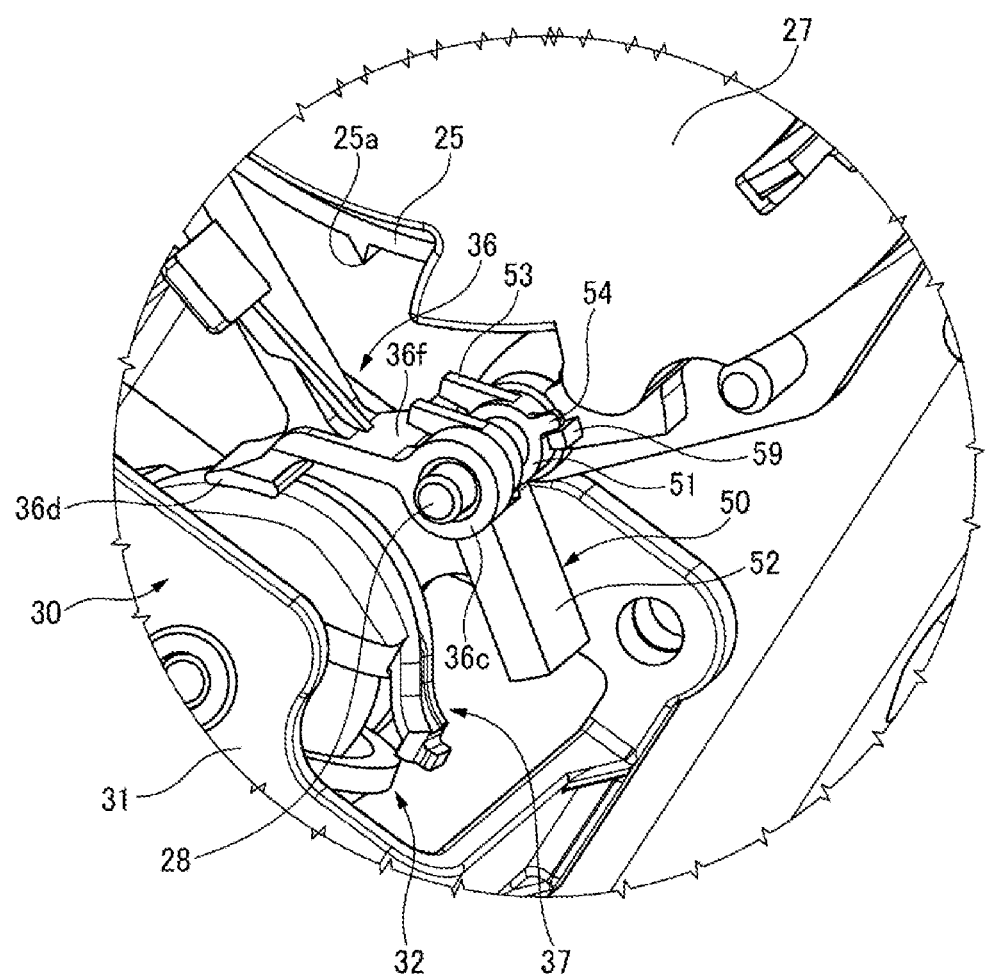
FIG. 6 is a perspective view illustrating the relationship in the part where the ratchet lever, the counterweight and the acceleration sensor are assembled.

As illustrated in FIG. 4 and FIGS. 5A and 5B, the ratchet lever 36 includes a pair of boss parts 36c, in each of which a fit hole 36b is provided, at its base end part 36g. The tip end part 36h is formed to have a substantial Y shape, in which the upper claw part 36a abutting against the steering wheel 25 and a lower abutment wall 36d abutting against the rib 37d of the sensor lever 37 are provided. The ratchet lever 36 is arranged on the lower side of the steering wheel 25, and, as illustrated in FIG. 6, a support shaft 28 that is provided projectingly on the steering wheel cover 27 coupled to the retractor frame 21 is turnably fitted into the fit holes 36b of the boss parts 36c.

It should be noted that the support shaft 28 may be provided projectingly on the retractor frame 21, or may be provided projectingly on the member that tilts integrally with the retractor frame 21, such as the steering wheel cover 27.

The ratchet lever 36 turns in the direction (upward) in which the tip end part 36h approaches the outer peripheral surface of the steering wheel 25, about the support shaft 28 fitted into the fit holes 36b, and allows the upper claw part 36a to engage with the locking teeth 25a of the steering wheel 25, so as to lock the steering wheel 25, operate an engagement part (not illustrated) that engages with locking inner teeth 21a provided on the side wall part of the retractor frame 21, and prevent the pull-out operation of the seatbelt 19. Incidentally, a stopper projection 36e that stops the pulling-out of the support shaft 28 in the axial direction, while the support shaft 28 is fitted into the boss parts 36c, is provided at the boss part 36c of the ratchet lever 36.

In addition, the ratchet lever 36 includes a lever abutment part 36i on the lateral side of the upper claw part 36a for preventing the operation of the ratchet lever 36 (namely, preventing the ratchet lever 36 from rotating toward the locking direction) by abutting against a switch lever 60 (refer to FIG. 2) when lock canceller is in operation.

The counterweight 50 is provided separately from the ratchet lever 36, and is provided for biasing the ratchet lever 36 toward the unlocking side (the direction separating from the outer peripheral surface of the steering wheel 25). The counterweight 50 operates integrally with the ratchet lever 36 so as to apply a rotary bias force toward the unlocking side to the ratchet lever 36, when the tilt angle of the seat back 16 is a predetermined angle (60° according to this embodiment) or more.

Specifically, as illustrated in FIGS. 5A and 5B and FIG. 6, the counterweight 50 includes boss parts 51 that are interposed between the pair of boss parts 36c of the ratchet lever 36, in which the support shaft 28 is turnably fitted, a weight part 52 that extends from the boss parts 51, moment transmission projections 53 and a rotation stopper 54 that are provided projectingly on the boss parts 51.

As illustrated in FIG. 7A, the moment transmission projection 53 does not engage with an engagement wall 36f of the ratchet lever 36 (a space CL1 is formed between the moment transmission projection 53 of the counterweight 50 and the engagement wall 36f of the ratchet lever 36) when the tilt angle of the seat back 16 is less than the predetermined angle (from 15° to less than 60°), so as to allow the ratchet lever 36 to turn freely (turn freely in the direction of an arrow R2 as the locking side). As illustrated in FIGS. 7B and 7C, the moment transmission projection 53 engages with the engagement wall 36f of the ratchet lever 36 (the space CL1 between the moment transmission projection 53 of the counterweight 50 and the engagement wall 36f of the ratchet lever 36 is not present) when the tilt angle of the seat back 16 is the predetermined angle or more (60° or more), so as to transmit rotational moment of the counterweight 50 by its self weight (rotational moment in the direction of an arrow R3 in FIG. 7C) as a rotary bias force toward the unlocking side (a rotary bias force in the direction of an arrow R4 in FIG. 7C to the ratchet lever 36. In other words, in order to turn the ratchet lever 36 toward the locking side (the direction of the arrow R2) when the tilt angle of the seat back 16 is the predetermined angle or more (60° or more), it is necessary to rotate the ratchet lever 36 against the rotary bias force of the counterweight 50.

Incidentally, it is not originally necessary to limit the rotation of the counterweight 50, except for the case where the counterweight 50 engages with the ratchet lever 36. However, according to this embodiment, the counterweight 50 is arranged in such a manner that a virtual circle I, drawn by the tip end of the counterweight 50, crosses the sensor lever 37, when the counterweight 50 is rotated about the support shaft 28, as illustrated in FIG. 7A. When the counterweight 50 is able to turn freely, the counterweight 50 interferes with the acceleration sensor 30. For this reason, the counterweight 50 is provided with the rotation stopper 54. This rotation stopper 54 engages with a projection 59 on the retractor frame 21 side, within a reclining angle range where the counterweight 50 may turn to interfere with the acceleration sensor 30, so as to limit the turning of the counterweight 50 relative to the retractor frame 21, and to prevent the interference between the counterweight 50 and the acceleration sensor 30. Meanwhile, according to this embodiment, it is necessary to set the counterweight 50 to be able to turn freely during a period while the retractor 11 tilts by 45°, that is, from 15° as the reference attachment posture of the seatbelt retractor 11, to 60° as the predetermined angle at which the counterweight 50 transmits to the ratchet lever 36 the rotary bias force toward the unlocking side. For this reason, when the seatbelt retractor 11 is at the reference attachment posture, as illustrated in FIG. 7A, the counterweight 50 is arranged to have a tilt angle of 45° or less relative to the vertical direction. Thus, when the reclining angle is 60° or more, a space CL2 is formed between the rotation stopper 54 and the projection 59 on the retractor frame 21 side, so that the counterweight 50 can turn freely.

Further, the positions of the turn axes of the ratchet lever 36 and the sensor lever 37 are set in the directions opposite to each other, viewed from the center of the ball 35, so that the ratchet lever 36 and the sensor lever 37 turn in the opposite directions when the ball 35 is displaced. According to this embodiment, the support shaft 28, as the turning center of the ratchet lever 36, is arranged at the position closer to the rear side of the vehicle than the turning projections 37a and 37b, as the turning center of the sensor lever 37.

Moreover, as illustrated in FIG. 3, the posture control mechanism 70 that controls the posture of the sensor housing 32 in the longitudinal direction of the vehicle is formed by a first pulley case 71 and a second pulley case 72 that are arranged inside side plates of the retractor frame 21, a pulley 73 housed in an inner space that is formed by assembling the first pulley case 71 and the second pulley case 72, an adjusting gear 74, a torsion spring 75 that rotatably biases the pulley 73, and a later-described rotation transmission mechanism that transmits the rotation of the adjusting gear 74 to the sensor housing 32 of the acceleration sensor 30.

The pulley 73, rotatably supported by the first pulley case 71 and the second pulley case 72 about a support shaft 71c provided on the first pulley case 71, converts advancing/retreating movement of the cable 13 by the cable advance/retreat device 80 into a rotary motion, and rotates, by an angle corresponding to the advancing/retreating movement of the cable 13, in the same direction as the tilt direction of the seat back 16. The pulley 73 is provided with a cable winding groove for winding the cable 13 on its outer peripheral surface, and one end part (upper end part) of the cable 13 is fixed to the pulley 73 via an end block 13a. Incidentally, the cable 13 is allowed to pass through a covering tube 13b and one end of the covering tube 13b is fixed to the first pulley case 71 and the second pulley case 72.

The torsion spring 75 rotatably biases the pulley 73 toward the winding direction of the cable 13. Further, the adjusting gear 74 is a rotation member that meshes with a gear (not illustrated), formed on the lateral part of the pulley 73, to make synchronous rotation by the same rotation angle in the direction opposite to the tilt direction of the seat back 16, and is turnably supported.

The rotation transmission mechanism transmits the rotation of the adjusting gear 74 to the sensor housing 32 and allows the sensor housing 32 to swing, so as to keep the inertial body support surface 33, as the sensor reference surface that is orthogonal to the sensor reference line, horizontally, by allowing the sensor reference line of the acceleration sensor 30 (the line that is orthogonal to the sensor reference surface passing through the center point of the ball 35 in the neutral position) to be orientated to the vertical direction in the longitudinal direction of the vehicle. The rotation transmission mechanism like this is formed by a combination of a pin 74c (refer to FIG. 2) and a slit 32h that are respectively formed on the adjusting gear 74 and the sensor housing 32 and that engage with each other. Incidentally, the slit 32h is formed in an arm 32i that is provided projectingly on the lower side of the lateral part of the sensor housing 32, as illustrated in FIG. 4.

Hereinafter, the function of this embodiment will be explained.

When the reclining angle of the seat back 16 is adjusted, the retractor frame 21 that is fixed to the seat back 16 is also tilted by the same angle. Meanwhile, the pulley 73 of the posture control mechanism 70 is rotated as the cable 13 is advanced/retreated by the distance corresponding to the reclining angle. When the pulley 73 is rotated in the same direction as the tilt direction of the seat back 16, the adjusting gear 74 is turned in the direction opposite to that of the pulley 73 and by the same angle as that of the pulley 73. This turning is transmitted by the rotation transmission mechanism to the sensor housing 32, and the sensor housing 32 is turned in the opposite direction by the same angle as the tilt angle of the seat back 16, so that the inertial body support surface 33 of the sensor housing 32 is kept horizontally.

In the case where, under this state, the acceleration that is in the horizontal direction and is higher than the predetermined value is applied to the acceleration sensor 30 due to the vehicle collision or the like, the ball 35 as the inertial body that is placed on the inertial body support surface 33 is displaced from the neutral position. Thereby, the sensor lever 37 is turned upwardly, the ratchet lever 36 is pushed up by this turning toward the outer peripheral surface side of the steering wheel 25, the upper claw part 36a of the ratchet lever 36 is engaged with the teeth 25a of the steering wheel 25, the rotation of the steering wheel 25 is limited, the feeding of the seatbelt 19 is prevented, and the occupant is restrained.

As the tilt of the sensor housing 32 in the longitudinal direction of the vehicle is kept horizontally at all times like this, the acceleration sensor 30 detects the acceleration properly and locks the pulling out of the seatbelt 19 without a delay in locking the seatbelt 19 at any cases such as when gentle deceleration toward the travelling direction of the vehicle is applied, and when a shift is made from slow deceleration to rapid deceleration.

Incidentally, when the tilt angle of the seat back 16 is increased, there is a risk that the ratchet lever 36 operates to the locking side due to the small shocks and the like, as the relationship between the turning center (support shaft 28) of the ratchet lever 36 of the lock mechanism 24 and the gravity center position of the ratchet lever 36 changes.

Figure 9:
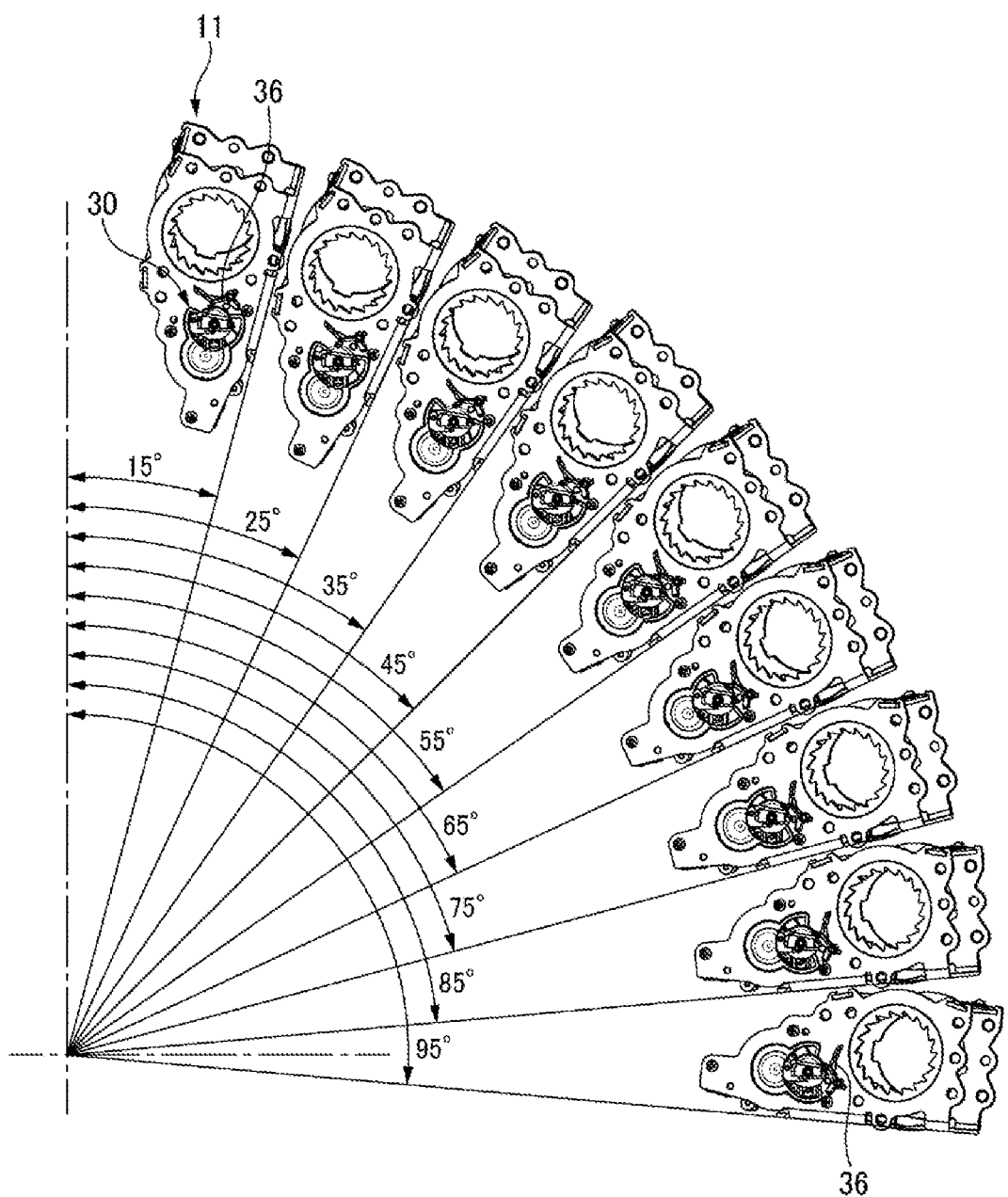
FIG. 9 is a side view illustrating how the posture of the ratchet lever changes according to the tilt angle of the seat back.

Specifically, when the tilt angle of the seatbelt retractor 11 increases together with the reclining of the seat back 16, as illustrated in FIG. 9, the posture of the ratchet lever 36 gradually changes from the posture extending toward the lateral side to the standing-up posture. The ratchet lever 36, formed to have a shape capable of operating smoothly in the reclining angle range that is used commonly (the range from about 15° to 45°, for example), is turnably supported in a cantilever state by the support shaft 28 (rotation center) on the base end side, and is set in such a manner that there is enough horizontal distance between the turning center of the ratchet lever 36 and the gravity center position of the ratchet lever 36, within this range. When the reclining angle is increased, however, the posture of the ratchet lever 36 gradually stands up and the horizontal distance between the turning center of the ratchet lever 36 and the gravity center position of the ratchet lever 36 is reduced.

Namely, when the tip end part 36h of the ratchet lever 36 supported on the side of the retractor frame 21 is placed on the sensor lever 37 of the acceleration sensor 30 by its self weight, similarly to the above-described seatbelt retractor 11, longer horizontal distance between the rotation center of the ratchet lever 36 and the gravity center position of the ratchet lever 36 is secured when the reclining angle of the seat back 16 (the tilt angle of the seat back) is small. This increases the rotational moment required for the rotation of the the ratchet lever 36, and prevents the accidental turning of the ratchet lever 36 to the locking side due to the small shocks and the like.

However, when the reclining angle of the seat back 16 is increased, the gravity center position of the ratchet lever 36 is displaced from the lateral side of the rotation center of the ratchet lever 36 toward the upper side, and the horizontal distance between the rotation center of the ratchet lever 36 and the gravity center position of the ratchet lever 36 is reduced. This facilitates the rotation of the ratchet lever 36 to the locking side by the low rotational moment. Namely, the ratchet lever 36 is easily rotated to the locking side by the small shocks and the like, and the upper claw part 36a of the ratchet lever 36 is engaged with the teeth 25a of the steering wheel 25, bringing about the state where the seatbelt 19 cannot be pulled out. When the seatbelt 19 is locked by slight shocks and the like, as described above, malfunctions are caused in handling the seatbelt 19 (such a problem that the seatbelt cannot be pulled out).

Therefore, with the seatbelt retractor 11 according to this embodiment, the ratchet lever 36 is rotatably biased toward the unlocking side by the counterweight 50, in addition to the rotational moment caused by the self weight of the ratchet lever 36 itself, as described above. This makes it possible to increase the rotational moment that is necessary to cause the ratchet lever 36 to turn toward the locking side, to prevent the ratchet lever 36 from rotating to the locking side easily due to the small shocks and the like, and to secure stable operation of the lock mechanism.

In this case, as described above, when the reclining angle of the seat back 16 is small, the high rotational moment can be secured by the self weight of the ratchet lever 36, and thus the ratchet lever 36 is not easily rotated to the locking side, even though the rotary bias force, other than the self weight, is not applied thereto. Meanwhile, when the reclining angle of the seat back 16 is increased, the horizontal distance between the gravity center position of the ratchet lever 36 and the rotation center of the ratchet lever 36 is reduced, so that the rotational moment by the self weight of the ratchet lever 36 is reduced, and accidental movement of the ratchet lever 36 to the locking side, due to the small shocks, is easily caused.

Therefore, with the seatbelt retractor 11 according to this embodiment, the rotational moment caused by the self weight of the counterweight 50 is applied to the ratchet lever 36 as the rotary bias force toward the unlocking side, when the reclining angle becomes the predetermined angle or more (60° or more).

Thereby, the accidental movement of the ratchet lever 36 to the locking side, when the reclining angle is large, can be prevented, and the smooth movement of the ratchet lever 36, according to the operation of the acceleration sensor 30, can be made possible without being affected by the counterweight 50, when the reclining angle is less than the predetermined angle. Further, when the reclining angle is the predetermined angle or more, the position of the counterweight 50 changes and the rotational moment of the counterweight 50 increases, by following the posture change of the ratchet lever 36, as the reclining angle increases. Therefore, the reduction in the rotational moment by the self weight of the ratchet lever 36 can be compensated by the increase in the rotational moment due to the self weight of the counterweight 50.

It should be noted that the counterweight 50 does not have the function of holding the ratchet lever 36 in the case of a head-on collision. In the case of a rear collision, the counterweight 50 operates in the direction of holding the ratchet lever 36, and the ratchet lever 36 itself is rotating toward the locking side, which are well balanced.

Explanations will be given with reference to FIG. 7 in which the ratchet lever 36 is displaced according to the respective angles. With the reference attachment posture as illustrated in FIG. 7A, in which the reclining angle is 15°, the rotation stopper 54 of the counterweight 50 abuts against the projection 59 on the retractor frame side, and the rotation of the counterweight 50 in the direction of an arrow R1 is limited, so that the counterweight 50 does not interfere with the acceleration sensor 30. Thus, as the interference between the counterweight 50 and the acceleration sensor 30 can be avoided when the use of the rotational moment by the counterweight 50 is not necessary, the disposition of the counterweight 50 can be made in a compact manner.

At this time, the space CL1 is provided between the moment transmission projection 53 of the counterweight 50 and the engagement wall 36f of the ratchet lever 36, which makes it possible for the ratchet lever 36 to turn freely in the direction of an arrow R2 within the space, and to allow the upper claw part 36a of the ratchet lever 36 to engage with the teeth 25a of the steering wheel 25.

Next, during the period until the reclining angle reaches less than 60°, that is, during the period until the reclining angle tilts by 45°, the center of gravity of the counterweight 50 is located directly below the rotation center of the counterweight 50. After that, the space CL2, in which the counterweight 50 can rotate freely in the direction of the arrow R1, is provided between the rotation stopper 54 of the counterweight 50 and the projection 59 on the retractor frame side.

Next, when the reclining angle becomes 60° or more, the moment transmission projection 53 of the counterweight 50 engages with the engagement wall 36f of the ratchet lever 36, so that the counterweight 50 and the ratchet lever 36 turn integrally. In this range, even when the vehicle is tilted in the forward and upward direction by 15°, due to an upward slope or the like, the engagement wall 36f of the ratchet lever 36 abuts against the moment transmission projection 53 of the counterweight 50. Therefore, the rotational moment by the self weight of the counterweight 50 is applied to the ratchet lever 36, which eliminates the possibility that the ratchet lever 36 is accidentally turned to the locking side due to the small shocks and the like, and that the pull-out operation of the seatbelt 19 is hindered.

When the acceleration sensor 30 detects the high acceleration under this state and the ball 35 is moved, the sensor lever 37 is moved upwardly, and the ratchet lever 36 is pushed up and is rotated together with the counterweight 50, so that the ratchet lever 36 engages with the teeth 25a of the steering wheel 25 and locks the pull-out operation of the seatbelt. Thus, the presence of the counterweight 50 does not hinder the lock operation.

Here, the results of the study about differences in the rotational moment between the case where the counterweight 50 is present and the case where the counterweight 50 is not present will be explained with reference to FIG. 8.

Figure 8A:
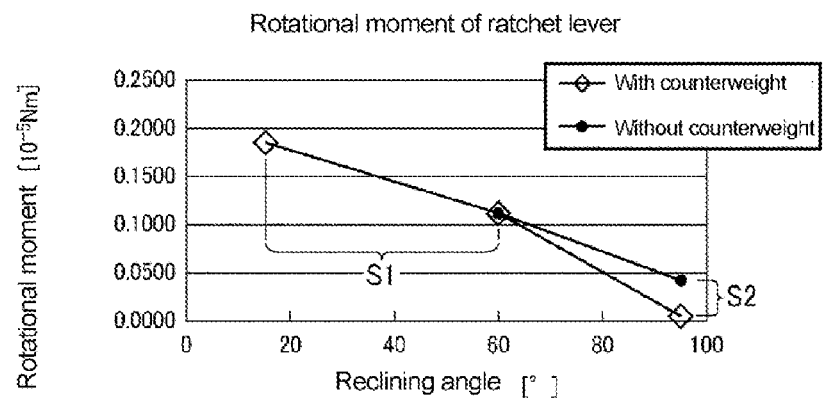
Figure 8B:
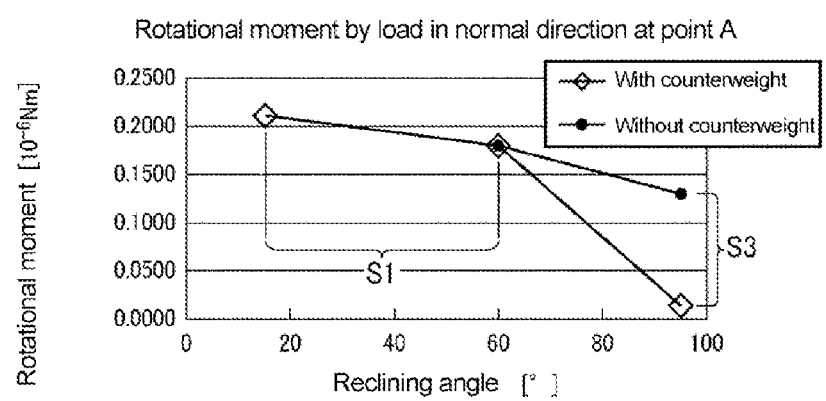
Figure 8C:
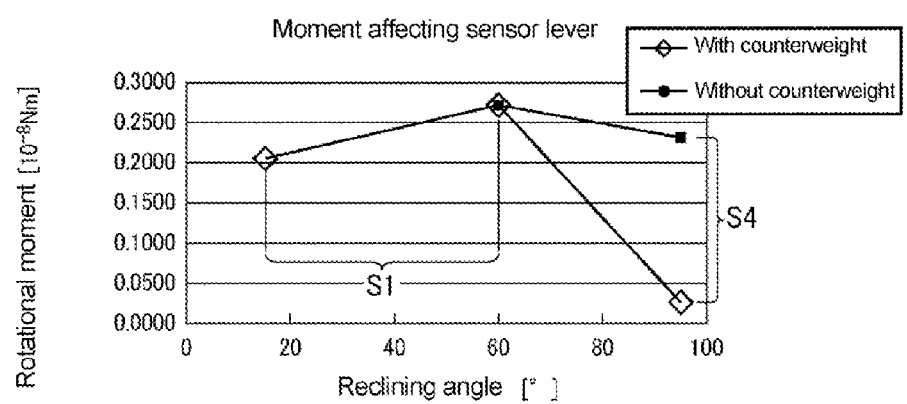

FIGS. 8A-8C are a set of graphs illustrating changes in the rotational moment according to the tilt angle of the seat back by comparing between the case where the counterweight is present and the case where the counterweight is not present, in which FIG. 8A is a graph illustrating the change in the rotational moment of the ratchet lever, FIG. 8B is a graph illustrating the change in the rotational moment by a load in the normal direction at a point A as a point of contact of the ratchet lever and the sensor lever, and FIG. 8C is a graph illustrating the change in the rotational moment affecting the sensor lever, respectively.

In each of the cases, the counterweight 50 and the ratchet lever 36 do not engage with each other in a range S1 that is from 15° to 60°, and the counterweight 50 does not affect the rotational moment.

Meanwhile, in a range of 60° or more, the rotational moment of the ratchet lever 36 as illustrated in FIG. 8A, the rotational moment by the load in the normal direction at the point A as the point of contact of the ratchet lever 36 and the sensor lever 37 as illustrated in FIG. 8B, and the rotational moment of the sensor lever 37 as illustrated in FIG. 8C increase by the rotational moments of S2, S3, and S4, respectively, as the reclining angle increases, in the case where the counterweight is present, as compared with the case where the counterweight is not present. Therefore, it is clear that the presence of the counterweight 50 makes it difficult for the ratchet lever 36 to be displaced to the locking side due to the small shocks and the like.

It should be noted that the present invention is not limited to the above-described embodiment, and modifications, improvements and the like can be made as appropriate. In addition, the materials, shapes, dimensions, numbers, arrangement positions and the like of the respective components of the above-described embodiment are not limited and can be freely selected as long as the present invention can be realized.

For example, the moment transmission projection 53, as a moment transmission part, is provided on the counterweight 50 according to this embodiment, but may be provided on the ratchet lever 36.

It should be noted that the present application is based on Japanese Patent Application (No. 2012-5403) filed on Jan. 13, 2012, and the contents of this application are incorporated herein by reference.

What is claimed is:
1. A seatbelt retractor comprising:
a retractor frame attached to a seat back of a reclining seat and tiltable with the seat back when adjusting a reclining angle of the seat back;
a spindle rotatably supported by the retractor frame and configured to wind a seatbelt;

an acceleration sensor attached to the retractor frame and configured to detect acceleration in a longitudinal direction of a vehicle;

a lock mechanism configured to lock pull-out operation of the seatbelt according to the acceleration in the longitudinal direction of the vehicle detected by the acceleration sensor; and a posture control mechanism configured to maintain a sensor reference surface of the acceleration sensor horizontally oriented, wherein the acceleration sensor includes:

a sensor cover attached to the retractor frame;

an inertial body that is moveable in the longitudinal direction of the vehicle when acceleration of a predetermined value or more is applied in the longitudinal direction of the vehicle;

a sensor housing having a swing shaft along a right/left direction of the vehicle, the sensor housing being supported by the sensor cover and having an inertial body support surface, on which the inertial body is supported, as the sensor reference surface, and the sensor housing being rotatable about the swing shaft by the posture control mechanism according to a tilt angle of the seat back so as to keep the inertial body support surface horizontally oriented; and a first lever arranged on an upper side of the inertial body and that is displaced together with movement of the inertial body in the longitudinal direction of the vehicle, displacement of the first lever operating to move the lock mechanism toward a locking side, and the lock mechanism includes:

a steering wheel that rotates integrally with the spindle, and that includes a plurality of locking teeth on its outer peripheral surface;

a second lever having a claw part configured to engage with the locking teeth of the steering wheel so as to lock the steering wheel, the second lever being rotatably supported by a support shaft provided on the retractor frame or a steering wheel cover that tilts integrally with the retractor frame, the second lever having a lower abutment wall biased into contact with an upper surface of the first lever by a force from its self weight of the second lever; and a counterweight provided separately from the second lever and configured to selectively engage the second lever depending on the tilt angle of the back seat so as to bias the second lever towards an unlocking side.

2. The seatbelt retractor according to claim 1, wherein the counterweight is configured to rotate at least partially about an axis depending on various tilt angles of the back seat thereby producing a rotational moment that is selectively applied as a rotary bias force on the second lever toward the unlocking side when the tilt angle of the seat back is a predetermined angle or more.

3. The seatbelt retractor according to claim 2, wherein the counterweight rotates coaxially with the support shaft, and one of the counterweight and the second lever is provided with a moment transmission part that allows the second lever to turn freely as a result of non-engagement between the counterweight and the second lever when the tilt angle of the seat back is less than the predetermined angle, and that transmits the rotational moment by a self weight of the counterweight to the second lever as the rotary bias force toward the unlocking side as a result of engagement between the counterweight and the second lever when the tilt angle of the seat back is the predetermined angle or more.

4. The seatbelt retractor according to claim 3, wherein the lock mechanism and the acceleration sensor are arranged such that a virtual circle drawn by a tip end of the counterweight crosses the first lever when the counterweight is rotated about the support shaft, and a rotation stopper located in a position that limits rotation of the counterweight relative to the retractor frame when the tilt angle of the seat back is less than the predetermined angle.

* * * * *